(12) United States Patent
Fan et al.

(10) Patent No.: US 10,248,937 B2
(45) Date of Patent: Apr. 2, 2019

(54) SYSTEM AND METHOD OF PROVIDING POST-PURCHASE MEDIA CONTENT TO A SUBSCRIBER

(75) Inventors: James Fan, San Ramon, CA (US); Thomas Barrett, San Ramon, CA (US); Jennifer Lam, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1192 days.

(21) Appl. No.: 12/949,995

(22) Filed: Nov. 19, 2010

(65) Prior Publication Data
US 2012/0130835 A1 May 24, 2012

(51) Int. Cl.
| | |
|---|---|
| *G06Q 20/12* | (2012.01) |
| *G06Q 20/18* | (2012.01) |
| *G06Q 30/06* | (2012.01) |
| *H04N 21/478* | (2011.01) |
| *H04N 21/482* | (2011.01) |
| *H04N 21/61* | (2011.01) |
| *H04N 21/488* | (2011.01) |

(52) U.S. Cl.
CPC ............ *G06Q 20/12* (2013.01); *G06Q 20/18* (2013.01); *G06Q 30/0601* (2013.01); *H04N 21/47815* (2013.01); *H04N 21/4828* (2013.01); *H04N 21/6181* (2013.01); *H04N 21/4882* (2013.01)

(58) Field of Classification Search
CPC ...... G06Q 10/00–10/30; G06Q 20/00–20/425; H04N 21/00–21/8586; H04M 3/00–3/64
USPC .................................................. 705/50–500
See application file for complete search history.

(56) References Cited

U.S. PATENT DOCUMENTS

| | | | |
|---|---|---|---|
| 5,721,583 A | 2/1998 | Harada et al. | |
| 7,716,137 B2 * | 5/2010 | Smith et al. | 705/52 |
| 8,229,861 B1 * | 7/2012 | Trandal | G06Q 30/012 705/26.1 |
| 8,295,452 B1 * | 10/2012 | Trandal | G06Q 30/01 379/265.02 |
| 2001/0034609 A1 * | 10/2001 | Dovolis | 705/1 |
| 2001/0034666 A1 * | 10/2001 | Berliner | 705/27 |
| 2003/0112948 A1 * | 6/2003 | Brown | H04M 3/42008 379/207.04 |
| 2004/0117269 A1 * | 6/2004 | Karaoguz | G06Q 30/0613 705/26.42 |
| 2006/0282319 A1 | 12/2006 | Maggio | |
| 2007/0090966 A1 | 4/2007 | Watanabe et al. | |

(Continued)

OTHER PUBLICATIONS

Minghua He, N. R. Jennings and Ho-Fung Leung, "On agent-mediated electronic commerce," In IEEE Transactions on Knowledge and Data Engineering, vol. 15, No. 4, pp. 985-1003, Jul.-Aug. 2003. (Year: 2003).*

*Primary Examiner* — Mohammad A. Nilforoush
(74) *Attorney, Agent, or Firm* — Toler Law Group, PC

(57) ABSTRACT

A method includes receiving purchase data at one or more computing devices associated with a media service provider. The purchase data includes information descriptive of a particular purchase made by a subscriber of the media service provider from a seller, where the seller is independent from the media service provider. The method also includes selecting media content available from the media service provider based on the purchase data. At least a portion of the selected media content is sent to a device associated with the subscriber.

16 Claims, 7 Drawing Sheets

(56) References Cited

U.S. PATENT DOCUMENTS

| | | | |
|---|---|---|---|
| 2008/0071627 A1* | 3/2008 | Junger | G06Q 20/203 705/22 |
| 2008/0177726 A1* | 7/2008 | Forbes et al. | 707/5 |
| 2008/0183852 A1* | 7/2008 | Pramer et al. | 709/223 |
| 2011/0131135 A1* | 6/2011 | Carlson et al. | 705/44 |
| 2013/0159445 A1* | 6/2013 | Zonka et al. | 709/206 |

* cited by examiner

SYSTEM AND METHOD OF PROVIDING POST-PURCHASE MEDIA CONTENT TO A SUBSCRIBER

BACKGROUND

Advances in technology have provided opportunities for manufacturers and retailers to save costs associated with providing certain functions of after purchase customer care. For example, the costs of providing instructions or customer support may be reduced by providing such instructions as downloadable content via a network. However, some customers may not be able to access Internet based content. Accordingly, potential cost savings may not be available since customer care functions for these customers may not be reduced. To illustrate, customers that do not have an Internet connection may not be able to access how-to manuals or other instructional information, thereby requiring the manufacturer or retailer to provide other avenues to enable the customer to access this information, such as delivery of printed materials.

DETAILED DESCRIPTION

Figure 1:
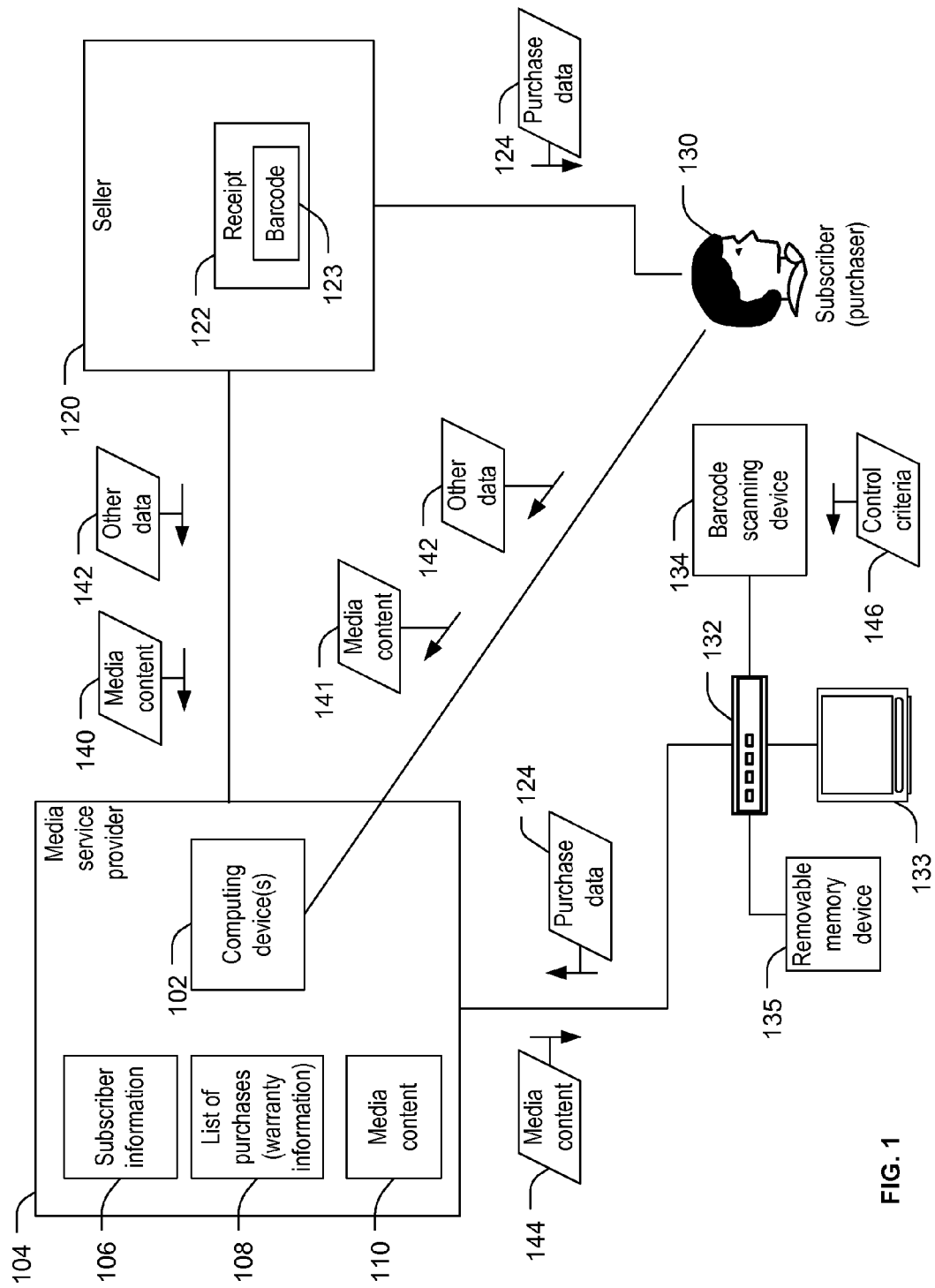
FIG. 1 is a diagram to illustrate a particular embodiment of a system of providing post-purchase media content to a subscriber.

Many consumers that do not have Internet access do have access to television-type interfaces. Typically, television-type interfaces are arranged for one-way information transfer. For example, a television service provider may send information that is received and displayed at the television interface. Additionally, a conventional television interface may not be arranged for conveniently searching for particular information. Thus, even if customer care information were available via the television interface, it may be difficult for a consumer to identify customer care content that is relevant to them by using an electronic program guide or other search interface available via the television.

In accordance with the disclosed techniques, a media service provider (such as a television content provider) may cooperate with manufacturers, retailers, or other providers of customer care information to enable the customer care information to be provided conveniently to customers via a television content provider network. The media content provider may provide a set of product or service channels that have information, such as how-to videos, on-line manuals, troubleshooting installation information, registration information, and configuration instructions to provide customer care follow-up information after purchases. The customer care information may be customized to the needs of the particular subscriber that accesses the information. For example, specific information may be provided to the media service provider from a seller or a subscriber providing specific information to the media service provider. The seller may be independent from the media service provider, and thus not merely an electronic storefront of the media service provider. In particular implementations, barcode or receipt information may be provided by the seller or by a purchaser (e.g. the subscriber) in order to access specific customer care information. The customer care information may be provided by the media service provider as video-on-demand content that includes various video clips.

A media service provider may also provide other services to purchasers to increase customer satisfaction. For example, the media service provider may store a list of purchases made by a subscriber and may use the list of purchases to provide follow-up information such as recall notices, notices of warranty expiration, and available updates or upgrades to a particular purchased product. Additionally, the media service provider may provide subscriber generated or user generated media content associated with a particular purchase. For example, the subscriber may generate a custom greeting or other message to accompany customer care information that will later be provided when a particular purchase is a gift. Additionally, the media service provider may use a list of purchases made by the subscriber or purchaser to identify contact information and facilitate the customer being able to access a responsible party associated with a particular purchased item in order for the customer to receive follow up information (e.g., to facilitate repairs or return of the product).

In a particular embodiment, a method includes receiving purchase data at one or more computing devices associated with a media service provider. The purchase data includes information descriptive of a particular purchase made by a subscriber of the media service provider from a seller, where the seller is independent from the media service provider. The method also includes selecting media content available from the media service provider based on the purchase data. The method further includes sending at least a portion of the selected media content to a device associated with the subscriber.

In another particular embodiment, a non-transitory computer-readable medium includes instructions that, when executed by a processor, cause the processor to receive purchase data at one or more computing devices associated with a media service provider. The purchase data includes information descriptive of a particular purchase made by a subscriber of the media service provider from a seller, where the seller is independent from the media service provider. The instructions are also executable to select media content available from the media service provider based on the purchase data and to send at least a portion of the selected media content to a device associated with the subscriber. The instructions are further executable to identify at least one responsible party associated with the particular purchase based at least partially on the purchase data. The at least one responsible party includes at least one of a manufacturer, a distributor, and the seller. The instructions are executable to automatically determine contact information associated with the at least one responsible party and to send the contact information to the device associated with the subscriber in response to a user request.

In another particular embodiment, a set-top box device includes a processor and a memory that is coupled to the processor and that stores instructions executable by the processor. The instructions are executable by the processor to transmit purchase data to a media service provider, where the purchase data includes information descriptive of a particular purchase made by a subscriber of the media service provider from a seller that is independent from the media service provider. The instructions are also executable to receive media content from the media service provider, where the media content is selected based on the purchase data.

FIG. 1 is a block diagram of a first particular embodiment of a system to provide customer care information to a user. The system includes a media service provider 104 that has one or more computing devices 102. For example, the one or more computing devices 102 associated with the media service provider 104 may include server computing devices located at the media service provider's office or location, set-top box devices, such as the set-top box device 132 that is associated with the media service provider 104 and with a particular subscriber or purchaser 130.

The media service provider 104 provides media content services, such as Internet Protocol Television (IPTV) services, via a network. The media service provider 104 may also provide additional services, such as telephony or Internet access services to the subscriber 130. It should be noted, however, that providing of such additional services is not necessary for a customer care service to be provided as described herein.

In a particular embodiment, the media service provider 104 may contract with one or more sellers, manufacturers, or distributors to provide customer care information to subscribers of the media service provider 104. For example, the media service provider 104 may have an agreement with a seller 120 to provide customer care information. To illustrate, the media service provider 104 may provide the customer care information by sending customer care information to the set-top box device 132 associated with the subscriber 130 for display at a television 133.

For example, when the subscriber 130 makes a purchase from the seller 120, the seller 120 may provide a receipt 122 to the subscriber 130. The receipt 122 may include purchase data 124. For example, the purchase data 124 may include information about the particular product or service purchased by the subscriber 130 from the seller 120. In a particular embodiment, the purchase data 124 may be encoded on the receipt 122 via a barcode 123. For example, the barcode 123 may be a line barcode, such as a universal product code (UPC), or may include a matrix barcode (also referred to as a quick response (QR) code or a two-dimensional barcode). The subscriber 130 may have access to a barcode scanning device 134 (e.g., coupled to the set-top box device). The barcode scanning device 134 may be used by the subscriber 130 to provide the barcode 123 to the set-top box device 132, and the set-top box device 132 may capture and send the purchase data 124 to the media service provider 104.

In a particular embodiment, the barcode scanning device 134 is integrated into a remote control device associated with the set-top box 132. For example, the remote control device may be provided with a barcode reader (e.g., a camera or optical scanner) that enables reading of the barcode 123 from the receipt 122. The purchase data 124 may be a relatively large set of data to transfer via an infrared communication protocol between the remote control device and the set-top box device 132. For example, the purchase data 124 may include information descriptive of a particular purchase made by a purchaser, such as the subscriber 130. Accordingly, the remote control device may be adapted to store the purchase data 124 on-board the remote control device and to transfer the purchase data 124 to the set-top box device 132 during periods when the remote control device is not in use. Additionally, the remote control device may include an alerting sub-system to provide an alert to the subscriber 130 when information is received at the set-top box device 132 from the media service provider 104.

In another particular embodiment, the barcode scanning device 134 is integrated into a mobile phone that is operable to communicate with the set-top box device 132 (e.g., via a wired or wireless customer premises network). Alternately, the subscriber 130 may input the purchase data 124 via a device other than the barcode scanning device 134 and/or the set-top box device 132.

The media service provider 104 may store the purchase data 124 in a list of purchases 108 associated with the subscriber 130. For example, when new purchase data 124 is received at the one or more computing devices 102, the one or more computing devices 102 may access subscriber information 106 that is associated with the subscriber 130. For example, the computing devices 102 may access subscriber information 106 based on which particular set-top box device 132 the purchase data 124 was received from, based on user access credentials, or both.

The media service provider 104 may also access particular media content 144 from a set of media content 110 and may send the particular media content 144 to the set-top box device 132 associated with the subscriber 130. The selected media content 144 may include customer care content associated with the particular purchase made by the subscriber 130. For example, the selected media content 144 may include seller generated content 140 that is generated by the seller 120 at the time of purchase of the particular product or prior to purchase of a particular product. For example, the seller generated content 140 may include a thank-you message or offers for follow on purchases.

In another example, the selected media content 144 may include user generated content 141. For example, the user generated content 141 may include content that the purchaser 130 sent to the media service provider 104 from a purchaser location associated with the purchaser. Alternately, the content 141 may have been generated at the seller 120 by the purchaser 130. By way of example, and not limitation, the user generated content 141 may include personalized greeting or other personalized message that was generated by the purchaser 130 while the purchaser was buying a gift for another subscriber (not shown) of the media service provider 104. The other subscriber may receive the personalized greeting/message along with the gift.

Subscribers, purchasers, or sellers may also provide other data 142 to the media service provider 104 that is used to facilitate selecting the media content 144. For example, the other data 142 may indicate how the subscriber 130 intends to use the particular product. To illustrate, when the subscriber 130 purchases a car seat from the seller 120, the subscriber 130 may provide information about a particular car that the subscriber 130 will be using the car seat in. The other data 142 may be sent to the media service provider 104 to select appropriate customer care information in the form of selected media content 144. For example, the selected customer care information may include installation instructions that are tailored to the specific car that the subscriber 130 intends to use the car set in.

In a particular embodiment, the subscriber 130 or another purchaser may provide control criteria 146 to the media service provider 104. The control criteria 146 may include information about when and how the selected media content 144 is to be provided. To illustrate, when the subscriber 130 has bought a gift and provided the purchase data 142 to the media service provider 104, the subscriber 130 may further specify control criteria 146 indicating when the selected media content 144 should be sent to the set-top box device 132 (e.g., a particular date and/or time corresponding to the gift recipient's birthday).

In a particular embodiment, the subscriber 130 may upload a set of purchase information or purchase data 124 via a removable memory device 135 coupled to the set-top box device 132. For example, to initially populate the list of purchases 108, it may be expedient for the subscriber 130 to generate and store a list of purchases onto a portable universal serial bus (USB) storage device or other removable memory device 135, and upload the list of purchases 108 from the set-top box device 132 via the removable memory device 135 rather than via the barcode scanning device 134. In another example, in order to provide the list of purchases 108 to another device, the list of purchases 108 may be downloaded from the media service provider 104 onto the removable memory device 135 for transfer to another device, such as a computing device associated with the subscriber 130.

FIG. 1 may thus enable a media service provider 104 to provide post-purchase customer care information to the subscriber 130, where the customer care information is associated with a prior purchase made by the subscriber 130. Moreover, the media service provider 104 may provide such customer care information even in situations where the subscriber 130 made the purchase from a third-party seller that is not associated with the subscriber.

Figure 2:
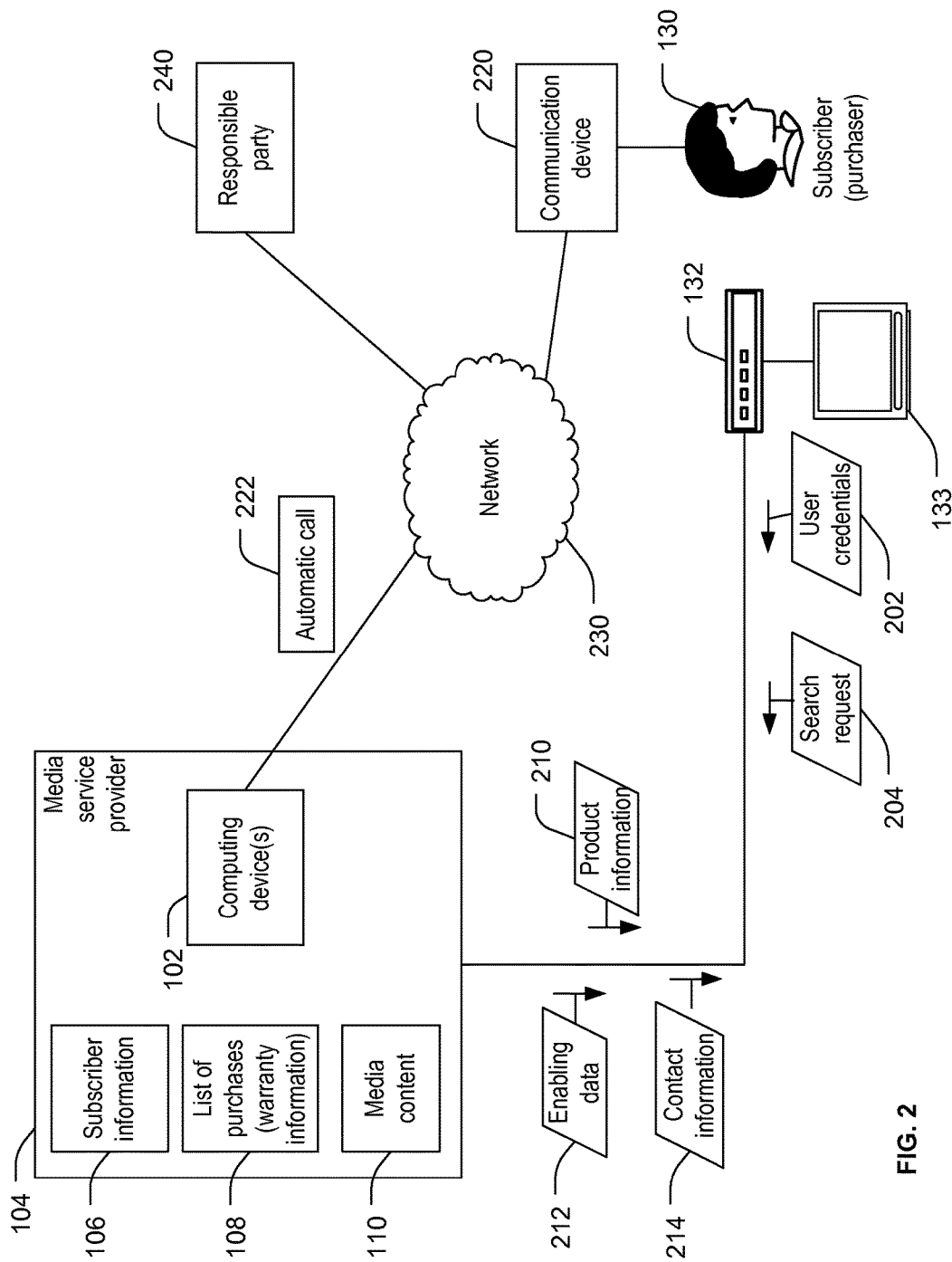
FIG. 2 is a diagram to illustrate another particular embodiment of a system of providing post-purchase media content to a subscriber.

FIG. 2 is a block diagram of a second particular embodiment of a system to provide customer care information. In the particular system illustrated in FIG. 2, the subscriber 130 may be associated with user credentials 202 that are used by the media service provider 104 to uniquely identify the subscriber 130 or a set of subscribers associated with the set-top box device 132. For example, when the set-top box device 132 is associated with more than one subscriber, the subscriber 130 may be associated with the user credentials 202 that differentiate the subscriber 130 from other subscribers associated with the set-top box device 132. To illustrate, each member of a family may have different user credentials 202. The user credentials 202 may be used by the media service provider 104 to identify which particular purchases of the list of purchases 108 are associated with the subscriber 130. In one embodiment, only the subscriber 130, and not any other subscribers, has access to the list of purchases 108 associated with the particular subscriber 130. For example, the subscriber 130 may be prompted to provide the user credentials 202 prior to being granted access to the list of purchases 108.

The list of purchases 108, and any other information available to the media service provider 104, may be used to gather customer care information for the subscriber 130. For example, the subscriber 130 may send a search request 204 to the media service provider 104. The search request 204 may be associated with a particular purchase or with a particular product previously purchased by the subscriber 130. In response to the search request 204, the media service provider 104 may access the list of purchases 108. The media service provider 104 may gather product information 210 associated with the particular purchase or purchases identified in the search request 204. For example, where the subscriber 130 has previously viewed media content 110 associated with the particular purchase and requests to re-access the media content, the subscriber 130 may send a search request 204 that is used by the media service provider 104 to again select the particular media content associated with the purchased item and to provide the media content or other information as product information 210 to the subscriber 130.

In another example, the media service provider 104 may access enabling data 212 that is sent to the subscriber 130 in response to the search request 204. To illustrate, a purchase made by the subscriber 130 may include a product that is deactivated upon purchase. The product may be configured to be activated using the enabling data 212 (e.g., an activation code) from the media service provider 104. Thus, the media service provider 104 may provide added value to sellers or other responsible parties 240. For example, not sending the enabling data 212 until after the purchase is made may reduce lost revenue due to theft.

As another example, in response to the search request 204, the media service provider 104 may access contact information 214 associated with one or more responsible parties 240. For example, the content information 214 may include a name, address, and e-mail address associated with the responsible party 240. The responsible party 240 may be a manufacturer, a distributor, a seller, or other responsible party associated with a particular purchase made by the subscriber 130.

The media service provider 104 may also automatically initiate a call 222 to the responsible party 240. For example, if the subscriber 130 is associated with a communication device 220, the media service provider 104 may generate a call to the responsible party 240 and bridge the call to the communication device 220 via a network 230. Thus, the media service provider 104 may facilitate routing a call between the subscriber 130 and the appropriate responsible party 240 for a particular purchase. To illustrate, within a return period (e.g., 30 days) of making a purchase, the media service provider 104 may route the subscriber 130 via a call to a particular seller associated with the purchase. However, after the return period has expired, the responsible party 240 may be changed to a manufacturer that underwrites a warranty associated with the particular purchased item.

Accordingly, the media service provider 104 may use the list of purchases 108 to intelligently route the subscriber 130 to the appropriate responsible party 240. Additionally, the responsible party 240 may provide expedited service to calls generated by the media service provider 104 as an additional value added service provided to the subscriber 130.

Figure 3:
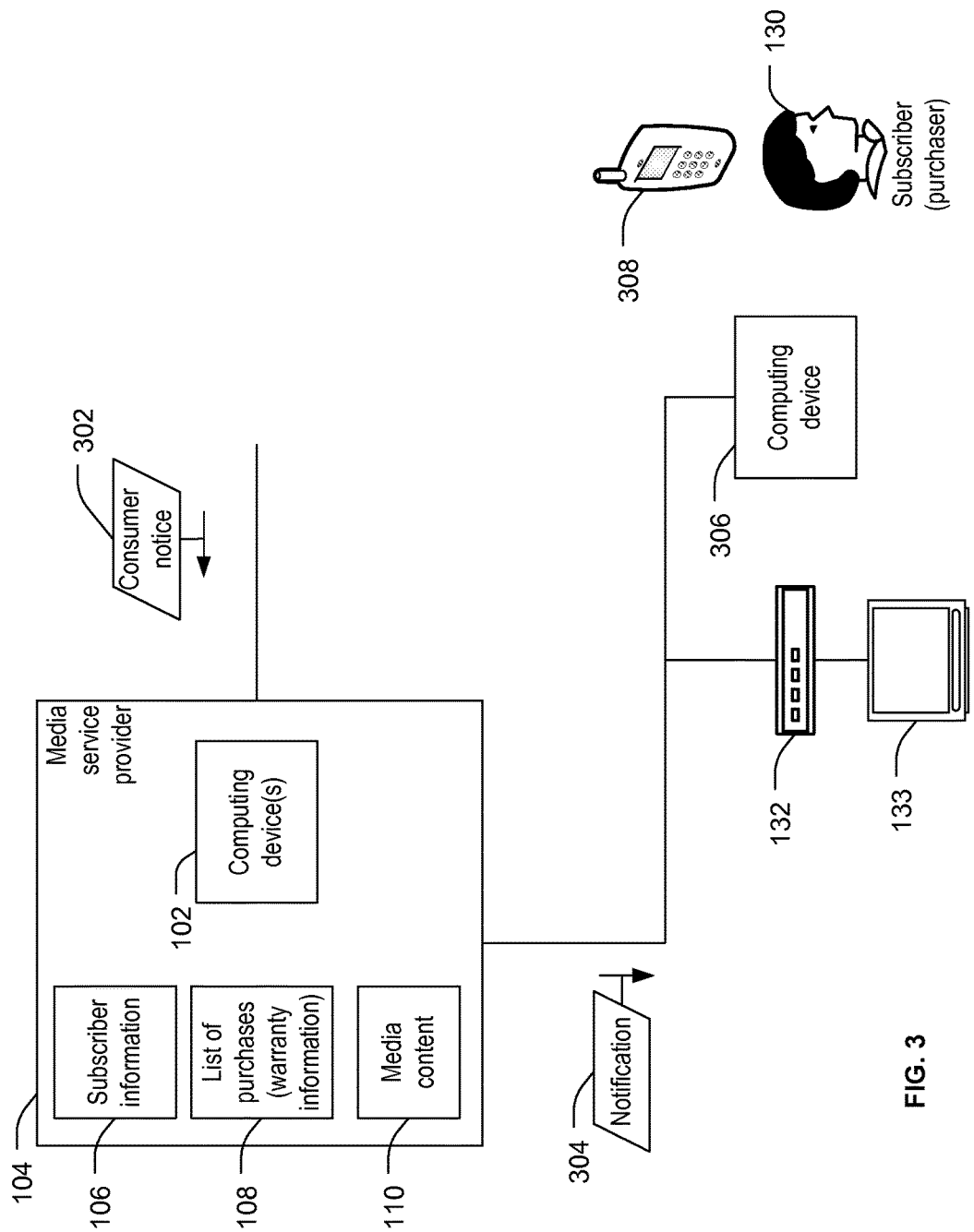
FIG. 3 is a diagram to illustrate another particular embodiment of a system of providing post-purchase media content to a subscriber.

FIG. 3 is a block diagram illustrating another particular embodiment of a system for providing customer care information to subscribers. In the system illustrated in FIG. 3, the media service provider 104 provides notifications or alerts 304 to the subscriber 130 via the set-top box device 132.

The media service provider 104 may access the subscriber information 106 to identify other communication devices associated with the subscriber 130 to provide the notifications 304. For example, the subscriber information 106 may identify a computing device 306 or a computing address (e.g., an IP address, media access control (MAC) address, or an e-mail address) associated with the subscriber 130. The media service provider 104 may transmit the notification 304 to the computing device 306.

In another example, the subscriber information 106 may identify a communication device, such as the mobile telephony device 308 associated with the subscriber 130. The notification 304 may be sent to the set-top box device 132, the computing device 306, the mobile telephony device 308, another communication device (not shown), or any combination thereof.

In a particular embodiment, which particular devices the notifications 304 are sent to is determined based on the type of information contained within the notifications 304. For example, when notification 304 includes information regarding a software product upgrade, the media service provider 104 may send the notification 304 to the computing device 306 where the software is installed and used. In another example, when the notification 304 indicates that a warranty has expired or is about to expire, the notification 304 may be sent the set-top box device 132 for display at the television 133 the next time the subscriber 130 turns on the set-top box device 132. In yet another example, the media service provider 104 may receive consumer notices 302, such as product recall or emergency notices. The media service provider 104 may access lists of purchases 108 associated each subscriber and identify subscribers that previously purchased the product that is subject to the recall or emergency. The media service provider 104 may send the notification 304 associated with the consumer notice 302 to all devices, including the set-top box device 132, the computing device 306, and the mobile telephony device 308.

In a particular embodiment, when an urgent notification is received from the media service provider 104, the set-top box device 132 may send the urgent notification to a remote control device associated with the set-top box device 132. The remote control device may be adapted to flash, vibrate, make noise, or otherwise get the subscriber's attention to indicate that an urgent notification is available via the set-top box device 132.

Thus, the system of FIG. 3 may enable the media service provider 104 to transit post-purchase product notifications, such as upgrade offers and emergency product recall notices, to the subscriber 130. In addition, the system of FIG. 3 may enable transmitting such notifications to multiple subscriber devices based on the content and urgency of the notifications.

Figure 4:
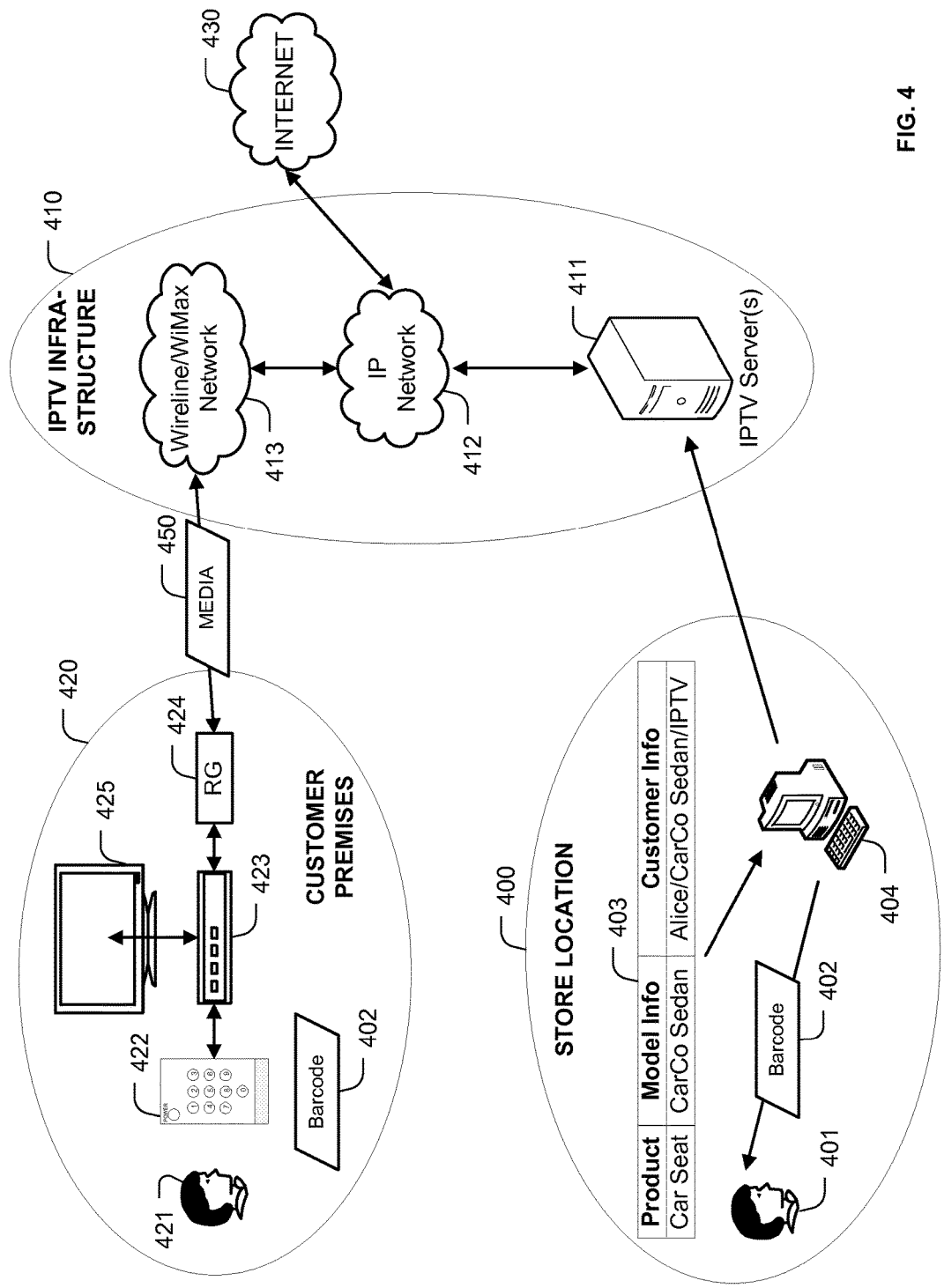
FIG. 4 is a diagram to illustrate another particular embodiment of a system of providing post-purchase media content to a subscriber.

FIG. 4 is a diagram to illustrate a particular embodiment of operation in accordance with the systems and method disclosed herein. The particular operational embodiment is described with reference to a hypothetical user Alice 421. Alice's sister Jane 401 has been invited to Alice's baby shower.

Prior to the baby shower, Jane 401 may visit a retailer 400 to purchase a gift. For example, Jane 401 may purchase a car seat. Jane's purchase of the car seat as a gift may generate purchase data 403. For example, the purchase data 403 indicates that the "Car Seat" product is for a "CarCo Sedan" vehicle and is intended for gift recipient "Alice," who owns a "CarCo Sedan" and is an "IPTV" customer. A sales associate at the retailer 400 may use a computer 404 to generate a barcode 402 representative of the purchase data 403. The barcode 402 may be encoded on a purchase receipt (e.g., gift receipt) provided to Jane 401.

The computer 404 may also transmit information regarding the barcode 402 and/or the purchase data 403 to one or more IPTV servers 411 that are part of an IPTV infrastructure 410. For example, the IPTV infrastructure 410 may be associated with an IPTV media service provider. The IPTV servers 411 may include request servers, content distribution servers, electronic program guide servers, analytics servers, video-on-demand servers, special content servers, and other servers. The IPTV infrastructure 410 may also include a private IP network 412, a wireline or wireless (e.g., WiMax) network 413 or both.

During the baby shower at Alice's house 420, Jane 401 may present Alice 421 with the car seat gift. Alice 421 may use a remote control device 422 to scan the barcode 402 on the gift receipt. The barcode 402 or metadata based on the barcode 402 may be transmitted from the remote control device 422 to the IPTV servers 411 via a set-top box 423 and a residential gateway 424 at Alice's house 420. The IPTV servers 411 may transmit media content 450 to the set-top box 423. For example, the media content 450 may be a how-to video clip that explains how to install the car seat in a CarCo Sedan vehicle. The set-top box 423 may display the media content 450 at a television 425. In an alternate embodiment, the media content 450 may be retrieved from the Internet 430.

In a particular embodiment the purchase data 403 indicates that Alice 421 owns a wireless phone that is capable of displaying the media content 450. In this embodiment, Alice 421 may go to her garage and watch the media content 450 on her phone while installing the car seat in her CarCo Sedan.

Figure 5:
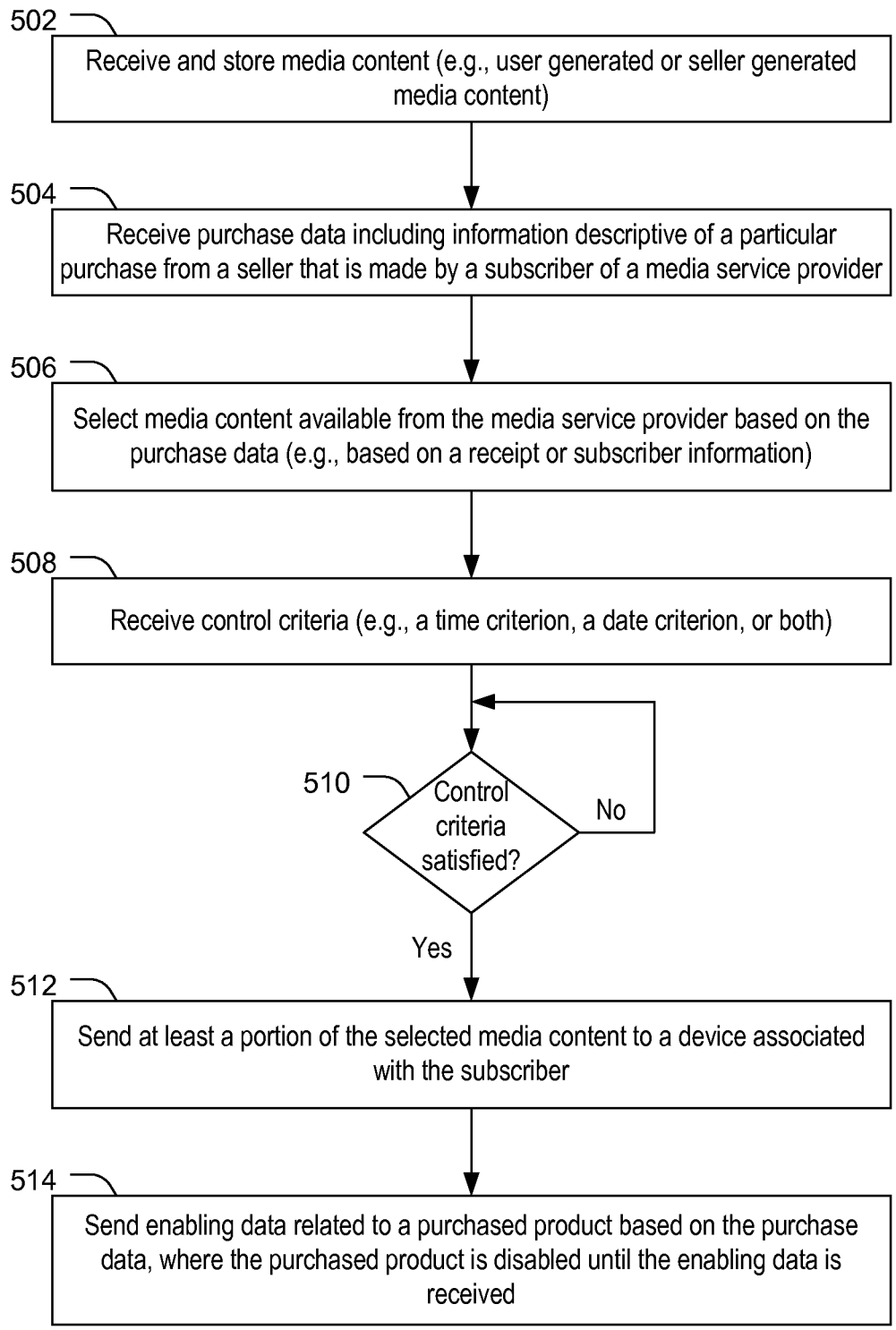
FIG. 5 is a flow diagram to illustrate a particular embodiment of a method of providing post-purchase media content to a subscriber.

FIG. 5 is a flowchart of a first particular embodiment of a method of providing customer care information. For example, the method of FIG. 5 may be performed by one or more computing systems or computing devices of a media service provider 104, such as the one or more computing devices 102 of FIGS. 1 through 3.

The method may include, at 502, receiving and storing media content. The media content may include user generated media content or media content generated by a responsible party (e.g., a manufacturer, a distributor, or a seller of a particular purchased good or service). To illustrate, user generated content may include a custom greeting or other information that is to be provided with other customer care information when media content is accessed in association with a particular purchase. The seller generated content may include a thank-you message generated by a seller.

The method may also include, at 504, receiving purchase data including information descriptive of a particular purchase from a seller that is made by a subscriber of a media service provider. The seller may be independent of the media service provider. For example, the particular purchase may not have been made from the media service provider, and may instead have been made from a retail seller, an Internet-based seller, a wholesaler, or another seller that is independent of the media service provider. The purchase data may be encoded onto a receipt by the seller. For example, the purchase data may be encoded into a barcode on the receipt. In this example, the purchase data may be accessed by use of a barcode scanning device by the subscriber. The barcode may include information identifying a particular product that was purchased as well as other information that is specified by the purchaser, such as a personal note added by the purchaser or information indicating a specific use to which the purchaser intends to apply the purchased product. In a particular embodiment, the purchase data may be received via a set-top box device associated with the subscriber or the media service provider. In this example, the method may also include accessing subscriber information based on a particular set-top box device that sends the purchase data to the media service provider. Particular media content may be selected based on the purchase data encoded on the receipt and on the subscriber information.

The method may further include, at 506, selecting media content that is available via the media service provider based on the purchase data. For example, the media content may be selected based on subscriber information, based on information encoded in a purchase receipt, based on information provided directly from the seller, based on other information associated with the purchase or any combination thereof. The selected media content may include video content that is associated with a particular purchase. For example, the video content may include a how-to video associated with the purchase. The how-to video may demonstrate installation, troubleshooting, registration, or configuration of a purchased product or service.

The method may include receiving control criteria, at 508. For example, the control criteria may be received from the subscriber and may include time and/or date criteria associated with presentation of the selected media content. A portion of the selected media content may be sent to a device associated with the subscriber in response to determining that the control criteria have been satisfied. To illustrate, the method may include, at 510, determining whether control criteria is satisfied.

When the control criteria is not satisfied, the method may continue to search/wait until the control criteria is satisfied at 510. When the control criteria is satisfied, the method may proceed and may send at least a portion of the selected media content to the device associated with the subscriber, at 512. For example, the device associated with the subscriber may be a set-top box device, a television, a computing device, a communication device, or some other device.

The method may also include, at 514, sending enabling data related to the purchased product based on the purchase data. For example, the purchased product may be disabled until the enabling data is received. To illustrate, the particular purchased product may be a software application whose installation requires an activation code or product key, and the enabling data may include the required activation code or product key.

Figure 6:
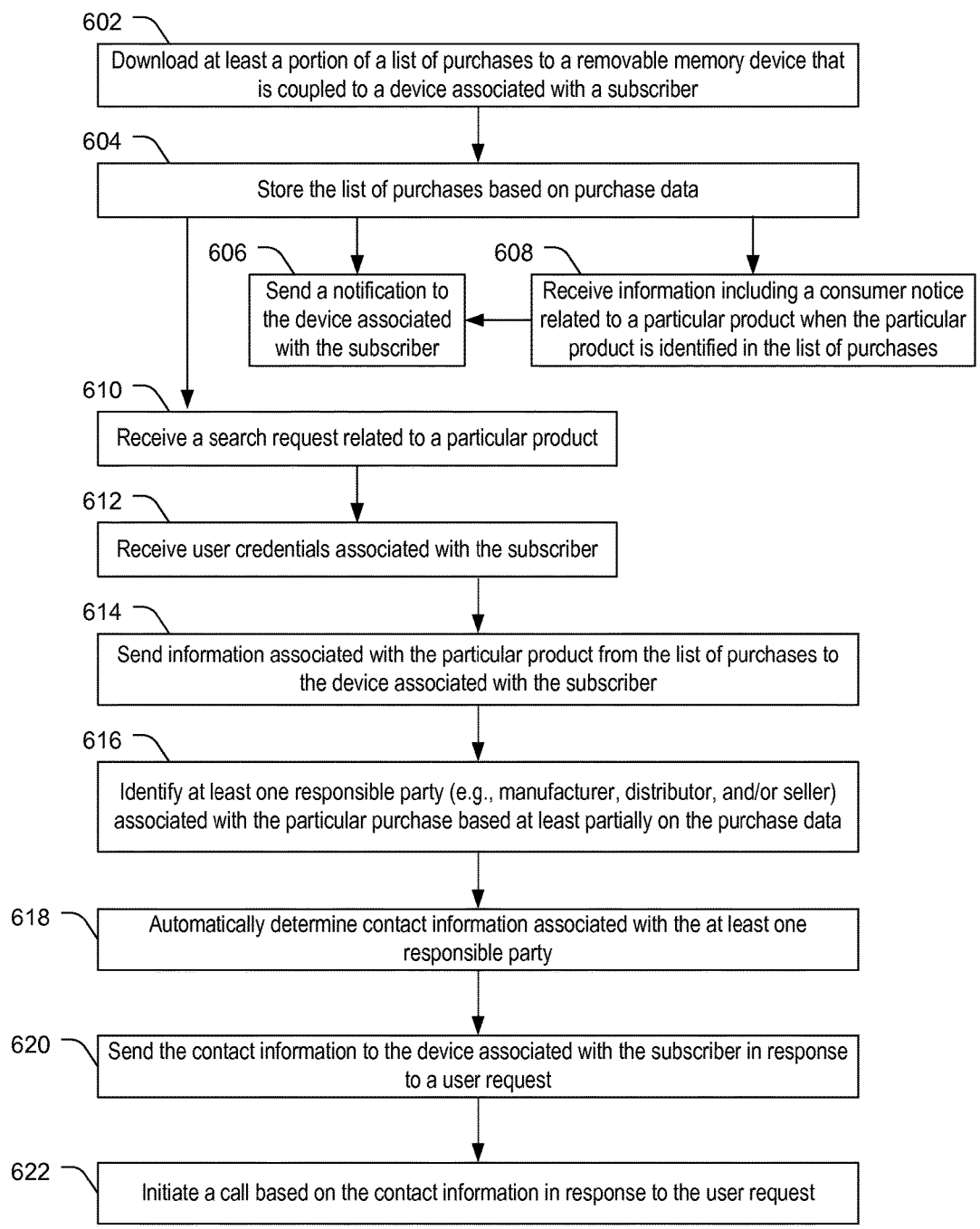
FIG. 6 is a flow diagram to illustrate a particular embodiment of a method of facilitating post-purchase communication between a subscriber and a responsible party.

FIG. 6 depicts a flowchart of another particular embodiment of a method of providing customer care information. The method may be performed by a computing device associated with a media service provider, such as one or more computing devices 102 or the set-top box device 132 illustrated in FIGS. 1 through 3. The computing device may include one or more set-top box devices or one or more server computing devices associated with the media service provider.

The method may include, at 602, downloading at least a portion of a list of purchases from a removable memory device coupled to a device associated with a subscriber. For example, the list of purchases may be stored on a removable memory device that can be coupled to a set-top box device associated with the subscriber. The list of purchases may include previous purchases made by the subscriber or may include a recent purchase by the subscriber.

The method may include, at 604, storing the list of purchases based on purchase data. The purchase data may include the list of purchases uploaded from the removable media device, at 602, or may include purchase data that is input by or on behalf of the subscriber with respect to a particular purchase. For example, the purchase data may be stored on a receipt provided to the purchaser by a seller. The receipt may have an encoded barcode that encodes purchase data that may be communicated by the purchaser or subscriber to the media service provider.

The method may include, at 606, sending a notification to the device associated with a subscriber based on information from the list of purchases. For example, when a warranty associated with a particular purchased item is approaching an expiration date, a media service provider may send a notification to the device associated with the subscriber.

The method may include, at 608, receiving information including a consumer notice related to a particular product. When the particular product is identified in the list of purchases associated with a particular subscriber, the method may include sending a notice, at 606, to the device associated with the subscriber. For example, when the consumer notice includes a recall associated with a particular product purchased by the subscriber, the media service provider may send a notice to a device associated with the subscriber to notify the subscriber of the recall. In another example, the consumer notice may include a notice of an upgrade or a notice of a sale associated with a related product.

In a particular embodiment, the method may include, at 610, receiving a search request related to a particular product. The method may also include, at 612, receiving user credentials associated with the subscriber. In response to receipt of the search request, the user credentials, or any combination thereof, the method may include, at 614, sending information associated with a particular product from the list of purchases to the device associated with the subscriber. To illustrate, the list of purchases may be associated with the subscriber by way of specific user credentials. When the user credentials are received, the list of purchases may be provided to the subscriber for the subscriber to browse through and select a particular product. As another example, the subscriber may be able to input search criteria that may be used to search the list of purchases for information about a specific purchase or product. The information provided from the list of purchases may include information provided by the purchase data as well as information that was gathered separately from the purchase data. For example, information associated with a particular product may include customer care information that was not provided by the purchase data but was provided by a responsible party, such as the seller, a distributor, or a manufacturer of the particular product. For example, the information may include particular media content that includes customer care information such as how-to video demonstrations of how-to use, install, troubleshoot, register, or configure a particular product. In another example, the information may include user manuals or warranty information associated with the product.

The method may include, at 616, identifying at least one responsible party associated with a particular purchase based at least partially on purchase data. For example the responsible party may be a manufacturer, a distributor, a seller, another party associated with a warranty, upkeep, manufacture, or distribution of the particular product. The method may also include, at 618, automatically determining contact information associated with the responsible party. The contact information may be sent, at 620, to the device associated with the subscriber in response to a user request. For example, in response to the user entering search criteria related to the particular product, the media service provider may transmit the contact information to the subscriber. In a particular embodiment, the method includes, at 622, initiating a call based on the contact information in response to user requests. For example, the call may automatically be initiated in response to the user indicating a desire to contact the responsible party. Initiating the call may include generating a call to the responsible party from the media service provider, generating a call to a communication device associated with a subscriber, and bridging the call to the responsible party and the call to the subscriber.

Accordingly, the systems and methods illustrated in FIGS. 1 through 6 enable provision of customer care information to subscribers of a media service provider. Provision of the customer care information to the subscribers of the media service provider may reduce costs to a seller, manufacturer, distributor, or other responsible parties associated with a particular product or service. The media service provider may provide customized video information such as how-to information to subscribers. Additionally, the media service provider may provide other services that facilitate use, repair, troubleshooting, and other customer care functions associated with a particular purchase.

For example, after viewing a video-on-demand clip that provides troubleshooting information and performing various troubleshooting steps, a user may determine that a particular problem is associated with their product. The media service provider may provide contact information to contact the responsible party in order to identify needed part based on the troubleshooting steps or may provide an input form that allows selection of the particular part and ordering of the particular part directly via the media service provider, (e.g., set-top box device and television coupled to the media service provider network). As another example, where the user has purchased a replacement part to be installed on a previously purchased product, purchase information associated with the replacement part may be input and the instructions to install the replacement part in the previously purchased product may be presented via media information from the media service provider.

In a particular embodiment, using a remote control device associated with the set-top box device to provide barcode reader capability may facilitate input of purchase data to enable easier searching or input of information associated with purchased products. The purchase data may be provided to a subscriber from a seller that provides customized content for a particular product. For example, the purchase data may point to specific media content that is associated with a particular purchase, such as seller or user generated media content that is associated only with this particular seller and with this particular purchase. As another example, the customized purchase data may include information about a specific intended use of the purchased product provided from the purchaser to the seller at the time of purchase. The specific intended use information may be encoded onto the receipt (for example, via a barcode) to facilitate input of the specific intended use information by transmission of the purchase data to the media service provider network. To illustrate, where the purchaser intends to use the purchased product for a particular purpose, e.g., to install it in a particular car, the information identifying a particular model and type of car may be provided by the purchaser to the seller at the time of purchase. The information may be encoded into the purchase data to facilitate information transfer of the purchase data to the media service provider for selection of media content for generation of a list of purchased items.

In another example, the purchase data may be associated with enabling data at the media service provider. The purchased product may be disabled until the enabling data is received. Thus, the purchase data provided to the media service provider may be used to access the enabling data which is then sent to a device associated with the subscriber for input or provision to the purchased product to enable the product.

Additionally, provision of the customer care information via the media service provider may enable multi-lingual support to be provided. For example, when a subscriber makes a purchase and a particular language of customer care information is not provided via information with the purchased item, the subscriber may use the media service provider network to access appropriate language customer care information. The appropriate language customer care information may be selected based on subscriber information stored at the media service provider. For example, if the Spanish language is indicated in the subscriber information as the preferred language associated with the subscriber, the media service provider may automatically select Spanish language customer care information associated with purchases made by the subscriber.

Accordingly, the systems and methods described may enable creation of new business models for television service providers or other media service providers to enter into contractual agreements with manufacturers, retailers, product service providers, other third parties, and responsible parties associated with particular products. The media service providers may provide information to customers and other responsible parties as a value-added service to the responsible party or to subscribers. Media service providers may designate a set of channels for video-on-demand content specifically associated with marketing and provision of customer care information. A set of application programming interfaces (APIs) may be provided to responsible parties to permit input of media content and information associated with media content with specific purchases. Additionally, the APIs may be provided to allow the responsible parties to send consumer notices or other information, such as up-sell information or notifications of related products, to the media service provider for provision of notifications to customers associated with particular products. An additional set of APIs may be provided to allow access to a list of subscriber purchases. For example, the APIs may be adapted to receive barcode data scanned by barcode scanning devices (such as remote control devices) associated with each subscriber. The APIs may further facilitate storing the list of purchases to removable media or uploading a list of purchases from removable media to the media service provider. Information about purchases made by a particular subscriber may be accessed via a media-driven interface similar to an electronic program guide interface. Additionally, the list of purchases may be navigated via direct search by inputting search criteria and optionally by inputting user credentials, and performing a search of all purchases associated with the particular user.

Figure 7:
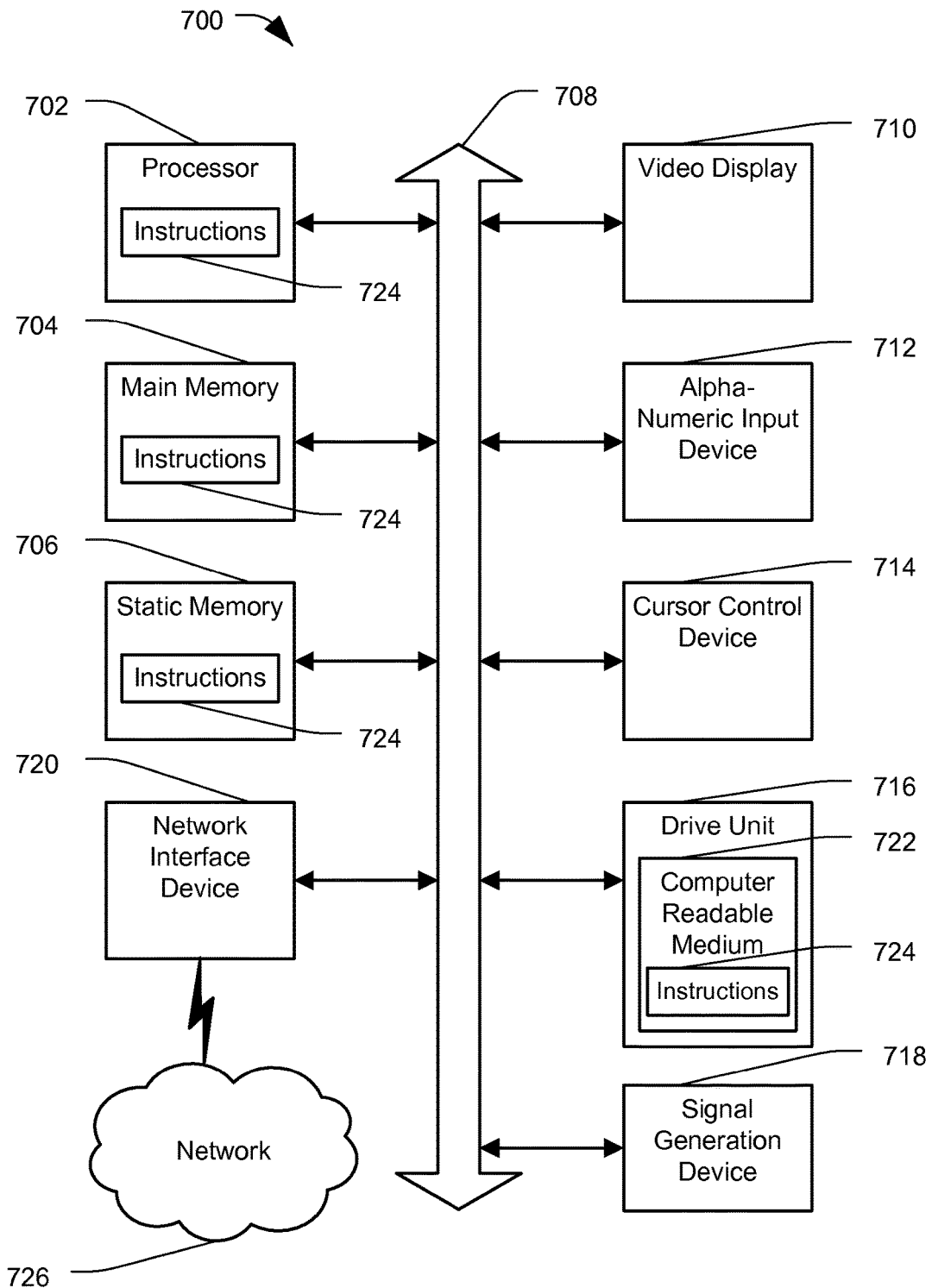
FIG. 7 is a block diagram of an illustrative embodiment of a general computer system.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices.

In a networked deployment, the computer system 700 may operate in the capacity of a set-top box device, a server, or a mobile computing device. The computer system 700 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include or be coupled to a video display unit 710, such as a liquid crystal display (LCD), an organic light emitting diode (OLED), a flat panel display, a solid-state display, or a projection display. Additionally, the computer system 700 may include an input device 712, such as a keyboard, a remote control device, and a cursor control device 714, such as a mouse. The computer system 700 can also include a disk drive unit 716, a signal generation device 718, such as a speaker or remote control device, and a network interface device 720. The network interface device 720 may be coupled to other devices (not shown) via a network 726.

In a particular embodiment, as depicted in FIG. 7, the disk drive unit 716 may include a non-transitory computer-readable medium 722 in which one or more sets of instructions 724, e.g., software, can be embedded. For example, the instructions 724 may enable the computer system 700 to perform one or more methods or logic described herein. In a particular embodiment, the instructions 724 may reside completely, or at least partially, within the main memory 704, the static memory 706, and/or within the processor 702 during execution by the computer system 700. The main memory 704 and the processor 702 also may include non-transitory computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates a non-transitory computer-readable medium that includes instructions 724 so that a device connected to a network 726 can communicate voice, video or data over the network 726. Further, the instructions 724 may be transmitted or received over the network 726 via the network interface device 720.

While the non-transitory computer-readable medium is shown to be a single medium, the terms "non-transitory computer-readable medium" and "non-transitory processor-readable medium" include a single medium or multiple media, such as a centralized or distributed database, and/or associated caches and servers that store one or more sets of instructions. The terms "non-transitory computer-readable medium" and "non-transitory processor-readable medium" shall also include any medium that is capable of storing a set of instructions for execution by a processor or that cause a computer system to perform any one or more of the methods or operations disclosed herein.

In a particular non-limiting, exemplary embodiment, the non-transitory computer-readable medium can include a solid-state memory such as a memory card or other package that houses one or more non-volatile read-only memories. Further, the non-transitory computer-readable medium can be a random access memory or other volatile re-writable memory. Additionally, the non-transitory computer-readable medium can include a magneto-optical or optical medium, such as a disk or tapes. Accordingly, the disclosure is considered to include any one or more of a non-transitory computer-readable storage medium and successor media, in which data or instructions may be stored.

It should also be noted that software that implements the disclosed methods may optionally be stored on a tangible storage medium. For example, the tangible storage medium may include a magnetic medium such as a disk or tape. As another example, the tangible storage medium may include a magneto-optical or optical medium such as a disk. As yet another example, the tangible storage medium may include a solid state medium such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, X10, SIP, TR-069, INSTEON, WEP, Wi-Fi and HTTP) and standards for viewing media content (e.g., MPEG and H.264) may represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
  receiving, by a computing device of a media service provider, purchase data of a subscriber of the media service provider, the purchase data including identification information of a first product;
  in response to receiving the purchase data, sending, by the computing device of the media service provider, media content associated with the first product to a device associated with the subscriber;
  receiving, by the computing device from the device associated with the subscriber, a search request associated with the first product;
  in response to receiving the search request, determining, by the computing device, a responsible party associated with the first product based on whether a return period associated with the first product is active, wherein determining the responsible party associated with the first product comprises:
    determining, by the computing device, that a return period associated with the first product is active based on a purchase date associated with the first product; and
    selecting a seller of the first product as the responsible party associated with the first product based on determining that the return period is active;
  placing, by the computing device, a first call to a communication device of the responsible party;
  placing, by the computing device, a second call to a second communication device of the subscriber; and
  bridging, by the computing device, the first call and the second call.

2. The method of claim 1, further comprising, before sending the media content, receiving information indicating an intent to use the first product with a second product, wherein the media content comprises instructions to install the first product in the second product.

3. The method of claim 1, wherein the purchase data includes identification information of a plurality of products that were purchased by the subscriber, and wherein the plurality of products includes the first product.

4. The method of claim 3, further comprising sending a notification to the device associated with the subscriber in response to determining that an expiration date of a warranty associated with a particular product of the plurality of products is approaching, wherein the purchase data includes warranty information associated with the plurality of products.

5. The method of claim 1, further comprising in response to the search request, sending second information associated with the first product to the device associated with the subscriber.

6. The method of claim 3, further comprising:
  receiving second information including a consumer notice related to a particular product of the plurality of products, wherein the consumer notice relates to a recall or an upgrade associated with the particular product; and
  sending a notification to the device associated with the subscriber, the notification including particular information regarding the consumer notice.

7. The method of claim 1, further comprising, in response to receiving, from the device associated with the subscriber, a second search request associated with a second product included in second purchase data:
  determining, by the computing device, a second responsible party associated with the second product based on whether a second return period associated with the second product is active, wherein determining the second responsible party associated with the second product comprises:
    determining, by the computing device, that a second return period associated with the second product is not active based on a second purchase date associated with the second product; and
    selecting a warrantor of the second product as the second responsible party associated with the second product based on determining that the second return period is not active;
  placing, by the computing device, a third call to a third communication device of the second responsible party;
  placing, by the computing device, a fourth call to the second communication device of the subscriber; and
  bridging, by the computing device, the third call and the fourth call.

8. The method of claim 3, further comprising:
  receiving user credentials associated with the subscriber; and
  correlating the purchase data with the subscriber based on the user credentials.

9. The method of claim 1, wherein a portion of the purchase data is based on information encoded in a barcode, and wherein the information encoded in the barcode is received by the computing device via a remote control device.

10. The method of claim 1, wherein the media content includes video content that depicts use, installation, troubleshooting, registration, configuration, or a combination thereof, of the first product.

11. The method of claim 1, further comprising sending data to the device associated with the subscriber, the data configured to activate a function of the first product.

12. An apparatus, comprising:
  a processor of a media service provider; and
  a memory coupled to the processor, the memory storing instructions that, when executed by the processor, cause the processor to perform operations including:
    receiving purchase data of a subscriber of the media service provider, the purchase data including identification information of a first product;
    in response to receiving the purchase data, sending media content associated with the first product to a device associated with the subscriber;
    receiving, from the device associated with the subscriber, a search request associated with the first product;

in response to receiving the search request, determining a responsible party associated with the first product based on whether a return period associated with the first product is active, wherein determining the responsible party associated with the first product comprises:

determining that a return period associated with the first product is active based on a purchase date associated with the first product; and selecting a seller of the first product as the responsible party associated with the first product based on determining that the return period is active;

placing a first call to a communication device of the responsible party;

placing a second call to a second communication device of the subscriber; and bridging the first call and the second call.

13. The apparatus of claim 12, wherein the operations further include:

receiving control criteria associated with the subscriber from the device, the control criteria identifying second media content, a particular time, and a particular destination device; and sending the second media content to the particular destination device at the particular time.

14. The apparatus of claim 12, wherein the operations further include determining to send the media content to the device associated with the subscriber based on a type of information included in the media content.

15. The apparatus of claim 14, wherein the operations further include sending second media content to the device associated with the subscriber in response to determining that the second media content includes a software update related to the first product.

16. The method of claim 1, further comprising receiving the search request at the computing device after sending the media content.

* * * * *